United States Patent [19]

Moriguchi et al.

[11] Patent Number: 4,509,823
[45] Date of Patent: Apr. 9, 1985

[54] REAR PROJECTION SCREEN

[75] Inventors: Yutaro Moriguchi, Tokyo; Makoto Honda, Kamifukuoka; Akira Izawa, Kawasaki, all of Japan

[73] Assignee: Dai Nippon Insatsu Kabushiki Kaisha, Tokyo, Japan

[21] Appl. No.: 541,297

[22] Filed: Oct. 12, 1983

[30] Foreign Application Priority Data

| Oct. 15, 1982 [JP] | Japan | 57-180790 |
| Oct. 15, 1982 [JP] | Japan | 57-155928[U] |
| Dec. 3, 1982 [JP] | Japan | 57-183175[U] |

[51] Int. Cl.³ ............................................. G03B 21/60
[52] U.S. Cl. .................................................. 350/128
[58] Field of Search ................ 350/127, 128; 358/237; 353/38, 74

[56] References Cited

U.S. PATENT DOCUMENTS

| 3,523,717 | 8/1970 | Glenn, Jr. | 350/128 X |
| 3,832,032 | 8/1974 | Shimada | 350/128 |
| 3,848,980 | 11/1974 | Plummer | 350/128 X |
| 4,418,986 | 12/1983 | Yata et al. | 350/128 |
| 4,439,027 | 3/1984 | Shioda et al. | 350/128 |
| 4,452,509 | 6/1984 | Van Breemen | 350/128 |
| 4,468,092 | 8/1984 | Inoue et al. | 350/128 |
| 4,469,402 | 9/1984 | Yata et al. | 350/128 |

Primary Examiner—Richard A. Wintercorn
Attorney, Agent, or Firm—Koda and Androlia

[57] ABSTRACT

A rear projection or translucent screen consisting of a circular Fresnel lens consisting of a plurality of concentrically circular lens elements and a lenticular lens having a plurality of corrugated parallel convex lens elements. Parallel projections or ridges are formed on the surface opposite to the lens surface of the lenticular lens and masking stripes are formed over the projections or ridges. The side surfaces of the projections or ridges are so defined that they will not intercept the light rays emerging from the corrugated parallel convex lens elements. According to one embodiment of the present invention, the top of each of the projections or ridges is formed with a groove and an ink is filled into the groove. According to another embodiment of the present invention, the position of each projection or ridge is deviated from the boundary between the adjacent corrugated parallel convex lens elements by a distance which is determined by a predetermined relationship.

10 Claims, 16 Drawing Figures

REAR PROJECTION SCREEN

BACKGROUND OF THE INVENTION

The present invention relates to a rear projection screen in which the image projected upon the screen can be observed by a viewer on the side opposite to the projector of a projection type color television system, moving system or the like.

In order to observe an enlarged television or motion-picture image in a lighted room, a rear projection or translucent screen consisting of a Fresnel lens and a lenticular lens has been generally used. In order to prevent the degradation of the contrast of the projected image, that is, in order to prevent the reflection of the undesired ambient light, the non-transmittance region (to be described in detail hereinafter) of the viewed surface of the lenticular lens is covered with masking stripes. The masking stripes are disposed (a) at the flat regions; (b) at the projected or protruded regions; and (c) at the recessed regions. In the case of covering the flat non-transmittance regions, the direct or transfer printing process is used. In the case of covering the projected or protruded regions with the masking stripes, the direct or transfer printing process or coating process is used. In the case of covering the recessed regions with the masking stripes, the coating process is used. It has been reported that the process for covering the projected or protruded regions with the masking stripes is most preferable because of the easiness with which the alignment between the masking stripes and lenticular convex lens elements is carried out and because it is rather simple to form the masking stripes. As compared with the process for covering the flat non-transmittance regions with the masking stripes, the process for covering the projected or protruded regions with the masking stripes is preferable because, in the case of the former, it is difficult to align the masking stripes with the lenticular convex lens elements. Furthermore, the process for covering the recessed regions with the masking stripes is not reliable in practice.

In the case of the rear projection or translucent screen in which masking stripes are formed over the projected or protruded regions, the projected or protruded regions are almost rectangular in cross section so that their side surfaces are substantailly perpendicular to the flat bottoms of the valleys between the adjacent projected or protruded regions and the masking stripes are formed over the tops of the projected or protruded regions. As a result, a light ray incident on a lenticular convex lens element at a point in the vicinity of the boundary between the adjacent lenticular convex lens elements is refracted at an angle with respect to the optical axis of the lenticular convex lens element and is intercepted by the perpendicular side surface of one of the projected or protruded regions. If the area of each masking stripe is increased, that is, the width of each protruded or projected region is increased in order to prevent the undesired reflection of ambient light rays, the end of each masking stripe may intercept the light rays having passed through the lenticular lens. Thus, there exists a limit in the increase of the area of each masking stripe. As a result, the conventional lenticular lenses cannot satisfactorily prevent the undesired reflection of ambient light rays, so that a clear projected image cannot be observed.

In addition, in the conventional rear projection or translucent screens, the masking stripes are formed in opposed relationship with the boundaries between the lenticular convex lens elements. In the center portion of the lenticular convex lens, the light rays from the projector, in general, enter each lenticular convex lens element in parallel with its optical axis. The light rays parallel with the optical axis of each lenticular convex lens element are focussed on the axis. Accordingly, the light rays incident on the center portion of the lenticular convex lens are not intercepted by the side surfaces of the projected regions or by the masking stripes.

However, in the circumferential portions of the lenticular lens, the light rays from the projector, in general, enter each lenticular lens element obliquely with respect to its optical axis thereby to be focussed on a point deviated from the optical axis. Accordingly, the light rays having passed through the lens element are partially intercepted by the side surfaces of the projected or protruded regions. As a result, the brightness of the projected image is decreased.

In the case of the projection type color television receivers in which red, green and blue light projectors are juxtaposed in the horizontal direction, the angles of incidence of red, green and blue light rays are different from one another, so that the amount of light rays intercepted by the masking stripes is different, especially in the peripheral portions of the lens, depending on the kind of light rays. Consequently, the three primary colors are not correctly mixed. Thus the positions of the masking stripes must be determined depending upon the positions of the corresponding lenticular convex lens elements.

In the conventional rear projection screens, a masking ink adheres to only the tops of the projections and does not adhere to the side surfaces of the projected or protruded regions when the ink is applied to the projections. Therefore, the side surfaces thereof cannot prevent ambient light in the lateral direction from being reflected on the side surfaces. When a viewer watches such a screen obliquely (in the lateral direction), the contrast of image is decreased.

Furthermore, there is a problem that a lenticular lens is apt to be formed in a manner such that the center portion of the lens is thicker than its circumferential portions when it is molded. Accordingly, the radii of the lenticular convex lens elements must be varied depending on the positions of the elements in the lens sheet in order to prevent the light rays coming out of the lens elements from being intercepted by the masking stripes.

SUMMARY OF THE INVENTION

In view of the above, one of the objects of the present invention is to provide a rear projection or translucent screen in which the projected or protruded regions are formed on the surface of a lenticular lens and the area of masking stripes formed on the regions is increased as much as possible as long as they will not intercept the light rays coming out of the lenticular convex lens elements, whereby the undesired reflection of the ambient light rays may be decreased remarkably and consequently the contrast of the projected image, especially when a viewer watches the screen obliquely, may be much improved.

Another object of the present invention is to provide a rear projection or translucent screen in which all the light rays incident on a lenticular lens can be transmitted therethrough without being intercepted, so that the bright, well-color-balanced projected image can be observed.

A further object of the present invention is to provide a rear projection or translucent screen in which even when a lenticular lens is not uniformly molded in thickness, the masking stripes will not intercept the light rays coming out of the lenticular convex lens elements.

According to the present invention there is provided a rear projection or translucent screen of the type comprising a circular Fresnel lens means having a plurality of concentrically circular lens elements and a lenticular lens means having a plurality of corrugated parallel convex lens elements formed over one surface thereof, the other surface of the lenticular lens means being formed with a plurality of parallel projections or protrusions extended in the longitudinal direction of the lenticular leans means, masking stripes being formed over the parallel projections or protrusions, the improvement wherein the side surfaces of each of said parallel projections or protrusions are so cut that they will not intercept the light rays emerging from said corrugated parallel convex lens elements of the lenticular lens means.

The above and other objects, effects and features of the present invention will become more apparent from the following description of preferred embodiments thereof taken in conjunction with the accompanying drawings.

BRIEF DESCRIPTION OF THE DRAWINGS

In the accompanying drawings:

FIG. 10 (A-C) is a view used to explain the transmission of light rays through a lenticular lens whose thickness is different depending on its portions;

DETAILED DESCRIPTION OF THE INVENTION

Figure 1:
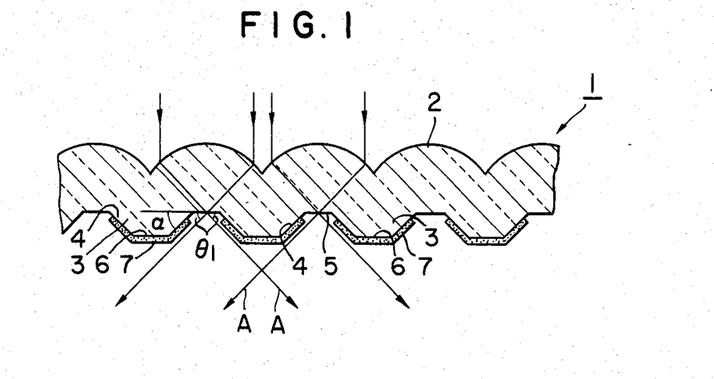
FIG. 1 is a partial sectional view of a first embodiment of a lenticular lens in accordance with the present invention.

In FIG. 1 is shown a first embodiment of a lenticular lens 1 in accordance with the present invention. The lenticular lens 1 has a plurality of corrugated lenticular (convex) lens elements 2 formed on one surface of an optically transparent base and a plurality of projections or ridges 3 which are trapezoidal in cross section and are formed on the other surface of the base. It should be noted that each of the projections or ridges 3 is disposed at the region which is out of the space in which the light rays are converged by the corresponding lenticular lens elements 2. (Such region as described above will be referred to as "non-transmittance region" in this specification.) The non-parallel and inclined side surfaces 4 of the trapezoidal projections or ridges 3 make an angle $\alpha$ with respect to the bottoms 5 of grooves between the adjacent projections or ridges 3. This angle $\alpha$ is smaller than 90°. The top surface 6 of each trapezoidal projection or ridges 3 and parts of its non-parallel side surfaces 4 are covered with a light absorption layer or masking stripe 7. It is preferable that the angle $\alpha$ is smaller than an angle $\theta_1$ between the bottom 5 and the light ray A refracted by the lenticular lens elements 2 and emerging from the bottom 5 so that the non-parallel side surfaces 4 will not interfere the light rays A and in addition the area of the light absorption layer 7 can be increased, whereby the reflection of undesired ambient light rays can be prevented. The angle $\alpha$ is determined depending upon the thickness of the corrugated lenticular convex lens elements 2 and upon the radii of the curvatures of the lens element 2 and in general is between 20° and 85°.

Figure 2:
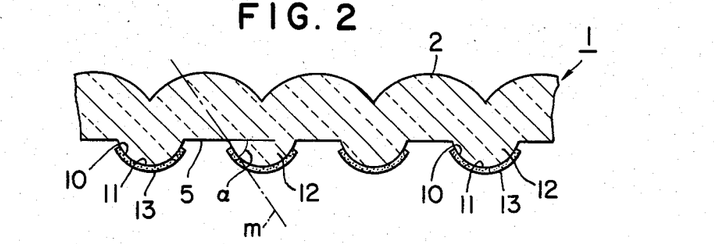
FIG. 2 is a partial sectional view of a second embodiment of a lenticular lens in accordance with the present invention.

In the above embodiment, each of the corrugated trapezoidal projections or ridges 3 has a flat top surface 6 and the straight non-parallel sides or flat non-parallel side surfaces 4, but it is to be understood that both the top and non-parallel side surfaces may be curved. That is, as shown in FIG. 2, each corrugated projection or ridge may be in the form of a dome in cross section. More particularly, each of the corrugated projections or ridges 12 has an arcuate side surfaces 10 and an arcuate top surface 11. A black stripe or light absorption layer 13 is applied to the arcuate projection or ridge 12. Alternatively, each corrugated projection or ridge may have curved side surfaces and a flat top surface (though not shown). When the corrugated arcuate projections or ridges 12 have curved or arcuate side surfaces 10 as shown in FIG. 2, the angle $\alpha$ between the bottom 5 and the tangent line m (indicated by broken lines) at the point where the arcuate side 10 and the bottom 5 intersect with each other is preferably less than 90°.

In the above embodiments, the masking stripes 7 or 13 are formed on the top surfaces 6 or 11 and parts of the side surfaces 4 or 10, but it is to be understood that it may be completely applied to the corrugated projections or ridges 3 or 12.

As described above, the corrugated projections or ridges 3 or 12 will not interfere the light rays A transmitted through the corrugated convex lens elements 2. Accordingly, the projected image becomes bright and a high degree of contrast can be obtained. In the conventional rear projection screens, the angle α is 90°, but according to the present invention the angle α is less than 90° so that the image projected over the rear projection screen in accordance with the present invention can be much improved in quality.

When each of the masking stripes 7 is applied to or otherwise formed on each corrugated trapezoidal projection or ridge 3 as shown in FIG. 1, the printing, transfer or coating process may be used, but the adhesion of ink to the center portion of the corrugated projection or ridge 3 is not satisfactory by any process. In other words, thick masking stripes cannot be formed. However, according to a third embodiment to be described with reference to FIG. 3, thick masking stripes can be formed. Furthermore, as the side surfaces of the projections 20 are obliquely cut, the masking ink can flow easily over the edges of the tops of the projections onto the side surfaces thereof thereby to adhere thereto. Accordingly, the reflection of ambient lights can be effectively avoided on the side surfaces thereof whereby the contrast of the images, especially when a viewer watches the screen obliquely, can be remarkably improved.

Figure 3:
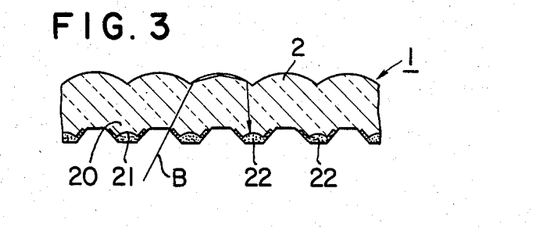
FIG. 3 is a partial sectional view of a third embodiment of a lenticular lens in accordance with the present invention.

Referring particularly to FIG. 3, the top surface of each of the corrugated trapezoidal projections or ridges 20 is formed with a channel-like groove 21 and an ink is filled into this channel-like groove 21 so that the ink adheres well to the center portion of the projections or ridges 20.

When such channel-like grooves 21 are provided, the light rays emitted from the viewers' side and totally reflected by the corrugated surfaces of the lens elements 2 are apt to pass through the lens portions corresponding to the masking stripes and strike against the backs of the masking stripes. Therefore, if the depth of the channel-shaped grooves 21 is made deeper, the reflected light rays may be prevented from reaching the viewers.

Figure 4:
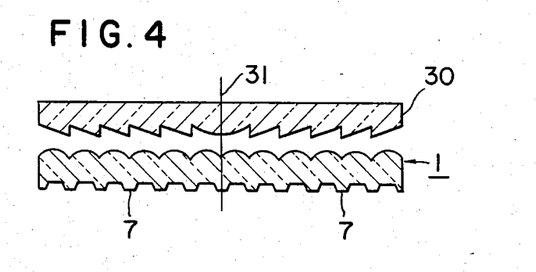
FIG. 4 is a sectional view of a rear projection or translucent screen in accordance with the present invention consisting of a lenticular lens and a Fresnel lens.

The lenticular lens (sheet) 1 in accordance with the present invention is used in combination with a circular Fresnel lens 30 as shown in FIG. 4. It should be noted that each of the concentric lenses of the circular Fresnel lens 30 is disposed in opposed relationship with each of the corrugated lenticular convex lens elements 2 of the lenticular lens 1. In addition, the masking stripes 7 are disposed immediately below the boundaries between the corrugated lenticular convex lens elements 2 at the center portion as viewed in FIG. 4, but in the vicinity of the peripheries of the lenticular lens 1, the masking stripes 7 are so disposed that they are respectively located closer toward the center line or axis 31 from the respective positions immediately below the boundaries as they approach the peripheries of the lenticular lens 1.

Figure 5:
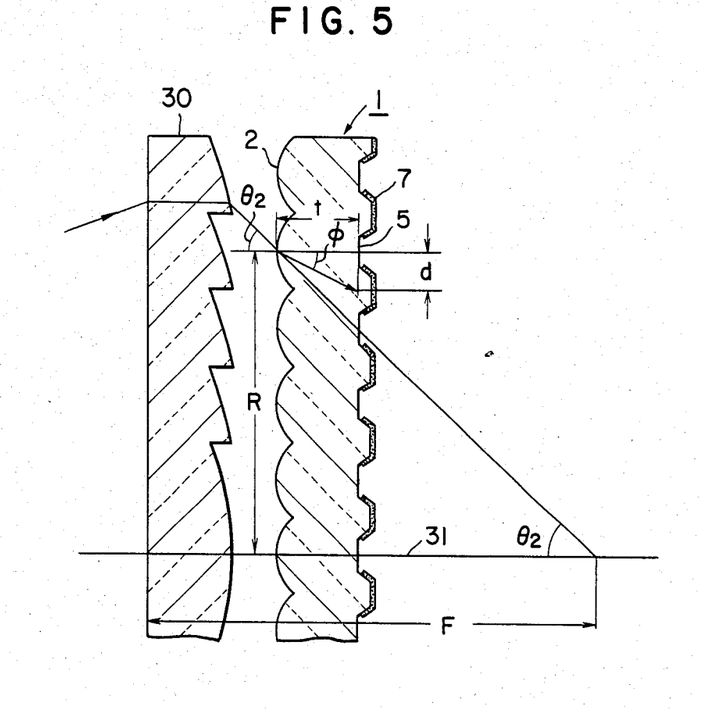
FIG. 5 is a view used to explain how the position of each masking stripe is determined.
Figure 6:
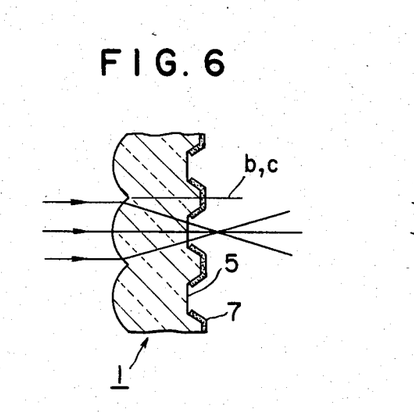
FIG. 6 is a view used to explain how the position of each masking stripe is determined at the center portion of a lenticular lens in accordance with the present invention.
Figure 7:
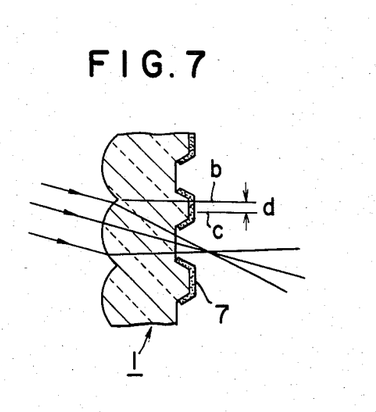
FIG. 7 is a view used to explain how the position of each masking stripe is determined at the portion in the vicinity of the periphery of a lenticular lens in accordance with the present invention.

In contrast with the conventional rear projection screens, according to the present invention, the masking stripes 7 are respectively displaced or deviated by a distance from the respective positions corresponding to the boundaries. This will be described in detail with reference to FIGS. 5, 6 and 7. Assume that a light ray emitted from a projector is refracted by the circular Fresnel lens 30 and is incident obliquely on the vertex of a lenticular lens element 2 at an angle $\theta_2$, the lenticular lens element 2 being spaced apart from the center line 31 of the lenticular lens 1 by a distance R. Then this light ray is refracted by the lenticular lens element 2 in accordance with the following relation:

$$\sin \theta_2 = n \sin \phi \tag{1}$$

wherein n is the index of refraction of the lenticular lens 1. The refracted light ray emerges from the lenticular lens element 2 at a point which is spaced apart by a deviation distance d from the optical axis of the lenticular element 2. Let a letter t denote the thickness of the lenticular lens 1, that is, the distance between the vertex of one of the corrugated lenticular convex lens elements 2 and the bottom 5 thereof. Then, the deviation distance d is given by $$d = t \times \tan \phi \tag{2}$$

Rewriting Eq. (1), we have $$\phi = \sin^{-1} \sin \theta_2 / n \tag{3}$$

Substituting Eq. (3) into Eq. (2), we have $$d = t \times \tan \sin^{-1} \sin \theta_2 / n \tag{4}$$

Meanwhile $$\theta_2 = \tan^{-1} R/F \tag{5}$$

where F is the focal length of the Fresnel lens in its image space. Substituting Eq. (5) into Eq. (4), we have $$d = t \times \tan \sin^{-1} \frac{\sin \tan^{-1}(R/F)}{n} \tag{6}$$

As described before, in the center portion of the lenticular lens 1, the light rays projected from the projectors enter each lens element in parallel with the optical axis of each lens element and are focussed on the optical axis. Accordingly, each masking stripe 7 is disposed in the position opposite to each boundary between the adjacent lens elements 2 in the vicinity of the center portion of the lens 1. That is, each masking stripe 7 is disposed symmetrically with respect to a line b passing the boundary between the adjacent lens elements 2.

However, in the vicinity of the periphery of the lenticular lens 1, the light rays emerging from the fresnel lens 30 enter each lens element 2 obliquely with respect to its optical axis as shown in FIGS. 5 and 7. In this case, taking a light ray incident on the vertex of the lens element 2 as an example, it comes out of the bottom 5 at the position deviated by the distance d from its optical axis. Accordingly, in peripheral regions of the lens 1, the center line c of each masking stripe 7 is deviated by the distance d from the line b, in order to prevent the masking stripe 7 from intercepting the light rays.

The deviation distance d is determined on the basis of the light ray incident obliquely on the center of each lens element 2 of the lens 1. The reason is as follows. The inventors of this application tried to determine the respective positions of the masking stripes in two different ways. One way was that the positions of the masking stripes were respectively determined considering divergence or refraction of light rays incident upon various points of each lenticular lens element 2. The other way was that they were respectively determined on the basis of only the light ray incident upon the vertex of each of the corrugated lenticular lens element 2.

Comparing the image-forming capabilities of two lenticular lens having respective masking stripes, with each other, the positions of which were respectively determined in the above two respective ways, their capabilities were substantially equal.

Furthermore, in a color television system, they tried to analyze the respective loci of the red, green and blue light rays which are respectively projected from the red, green and blue light projectors located in the horizontal direction at equal intervals, which are respectively refracted on the lenticular lens elements and which respectively pass therethrough. In general, the center of the regions where the red and blue light rays emerge from each lens element coincides with the center of the region where all light rays emerge from each lens element. However, in this experiment, the inventors also found out that the center of the region where all light rays emerged from each lens element substantially coincided with the position where the green light rays from the projector located in the intermediate position between the red and blue projectors passed in the space on the side of viewers after the green light rays entered each lens element 2 at its center portion, refracted on the lens surface and emerged from each lens element 2.

Accordingly, it is understood that the distance d may be determined by using the light ray incident on the center portion of each lens element 2.

Figure 8:
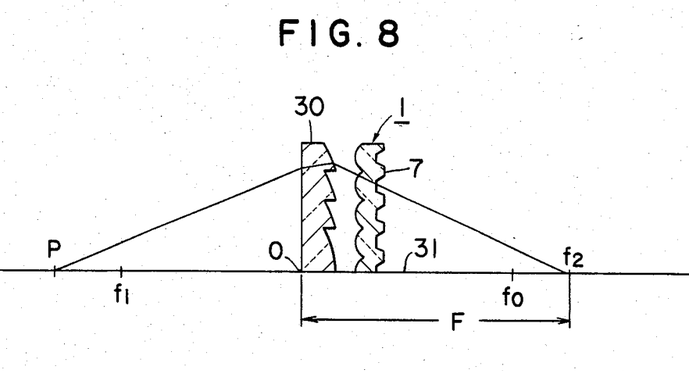
FIG. 8 is a view used to explain the relationship between the Fresnel lens of a rear projection or translucent screen in accordance with the present invention and a light ray emitted from a projector, transmitted through the screen and converged.

Some dimensional factors of the circular Fresnel lens 30 and the lenticular lens 1 will be described. Firstly, the focal length F of the circular Fresnel lens is between 2 and 20 meters and more preferably between 5 and 10 meters. It should be noted that the focal length F of the circular Fresnel lens 31 is not a distance $Of_0$ between the center o of the Fresnel lens 30 and the point $f_0$ at which a light ray incident on the FResnel lens 30 in parallel to the optical axis of the lens 30 is focussed, but a distance $Of_2$ between the center o and the point $f_2$ at which a light ray projected by a projector located in a further position p than the focus $f_1$ of the lens 30 passes through the Fresnel lens to be intersected with the optical axis. That is, the projector is located in a position p axially outwardly spaced apart from the focal point $f_1$ of the circular Fresnel lens 30 and the projected light rays are not parallel with its optical axis. As a result, the light rays projected from the projector are diverged and enter the circular Fresnel lens 30. After refraction, they are focussed at a point $f_2$ axially outwardly spaced apart from the focal point $f_0$ of the Fresnel lens 30.

Figure 10:
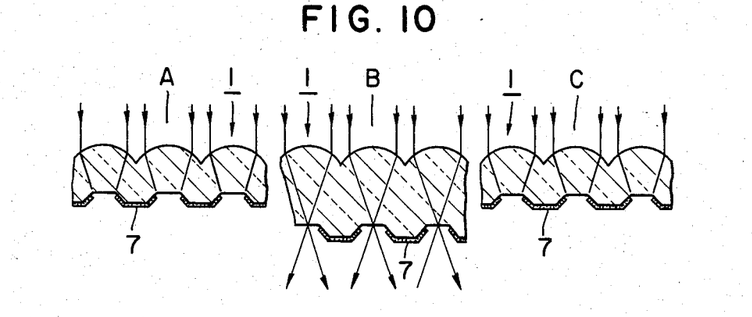

The horizontal length or width of the circular Fresnel lens 31 and the lenticular lens 1 is between 500 and 2000 mm and more preferably between 700 and 1200 mm. The thickness t (See FIG. 5) of the lenticular lens 1 is so determined that the area of the masking stripes becomes as great as possible without intercepting the light rays passing through the lenticular lens 1 as shown in FIG. 10B. This will be described hereinafter with reference to FIG. 10. Therefore, the thickness t is preferably between 0.8 and 2 mm.

The cross sectional configuration of the corrugated lenticular convex lens elements 2 may be arcuate or a part of an ellipsoid or parabolide.

The pitch of the concentrically circular lens elements of the circular Fresnel lens 31 is in general between 0.1–1.0 mm while the pitch of the corrugated lenticular convex lens elements of the lenticular lens 1 is in general between 0.8–1.5 mm. When the former is equal to or substantially equal to the latter, Moire fringes or patterns tend to be produced. It is therefore preferable that the ratio of the former and the latter is 2:3.

The width of each masking stripe 7 formed over each corrugated lenticular convex lens element 2 is in general 40–70% of the pitch between the adjacent elements 2. For instance, when the width of the lenticular lens 1 is 950 mm and the pitch is 1 mm, the maximum width of the masking stripe 7 is of the order of 100 microns.

So far it has been described that the lens surface, that is, the corrugated surface of the circular Fresnel lens 30 is disposed in opposed relationship with the lens surface of the lenticular lens 1 as shown in FIG. 4, but it is to be understood that the flat surface of the circular Fresnel lens 30 may be disposed in opposed relationship with the lens or corrugated lens element surface of the lenticular lens 1. However, it is preferable that the corrugated surface of the circular Fresnel lens 30 is made into intimate contact with the lens surface of the lenticular lens 1 as shown in FIG. 4 because dust particles may be prevented from being accumulated over the lens surfaces and consequently the contamination of lens surfaces can be avoided.

Figure 9:
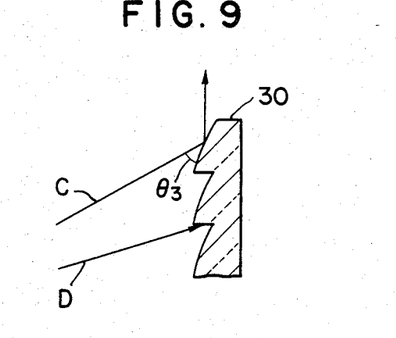
FIG. 9 is a view to explain the loss of an incident light ray when the lens surface of the Fresnel lens is faced toward a projector.

If the lens surface of the circular Fresnel lens 30 is directed toward a projector as shown in FIG. 9, an incident angle $\theta_3$ becomes smaller, resulting in the total reflection. However, when the lens surfaces of the circular Fresnel lens 30 and the lenticular lens 1 are made into intimate contact with each other, such problem can be avoided. In addition, the circular Fresnel lens 30 may have a shorter focal distance so that the radii of curvatures of lens elements can be reduced. As a consequence, the projector can be made in compact in size. Furthermore, no light ray emitted from the projector is incident on the step as indicated by D in FIG. 9, so that the loss in light quantity can be avoided.

In the case of the fabrication of the lenticular lens in accordance with the present invention, a thermoplastic transparent plastic such as acryl plastic is extruded and then the corrugated lenticular convex lens elements 2 and the corrugated projections or ridges 3 or 12 are formed by a press. Thereafter the masking stripes 7 are formed by the direct printing, transfer printing or coating process.

When a press roll is used in the case of forming corrugated lenticular convex lens elements 2 and corrugated projections or ridges 3 or 12, the center portion of the lenticular lens 1 is raised or the thickness of the center portion becomes greater than the thickness of the edge portions as shown in FIG. 10. In this case, at the center portion B, the light rays emerge from the lenticular lens 1 without being intercepted by the masking stripes 7, but at the edge portions A and C, the light rays emerging from the lenticular lens are intercepted by the masking stripes 7 so that the light quantity is reduced. In order to overcome this problem, there may be proposed to reduce the size of the masking stripes 7 at the edge portions A and C, but in practice, the external or ambient light rays, that is, those which are not emitted from the projector, are reflected from the regions which are not formed with the masking stripes 7. As a result, the contrast of the projected image is considerably degraded.

Figure 11:
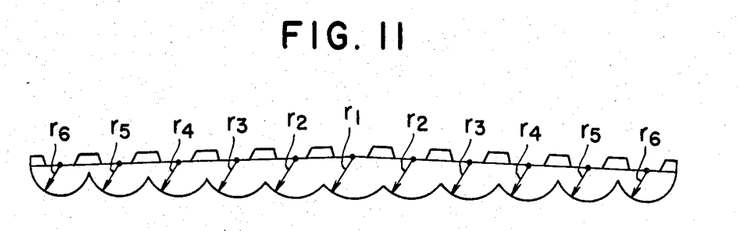
FIG. 11 is a sectional view of a molded lenticular lens in accordance with the present invention.

Therefore, when the masking stripes are formed on the lenticular lens 1 in accordance with the present invention, the thickness of various portions of the lenticular lens 1 must be taken into consideration. That is, as shown in FIG. 11, according to the present invention, the radii of curvature $r_1$ to $r_6$ are gradually decreased from the center to the periphery of the lenticular lens 1. Then the angle of refraction of the incident light ray becomes greater at the edge portions A and C. As a result, even when the width of all the masking stripes is same, the incident or emerging light rays are not intercepted by the masking stripes 7.

Figure 12:
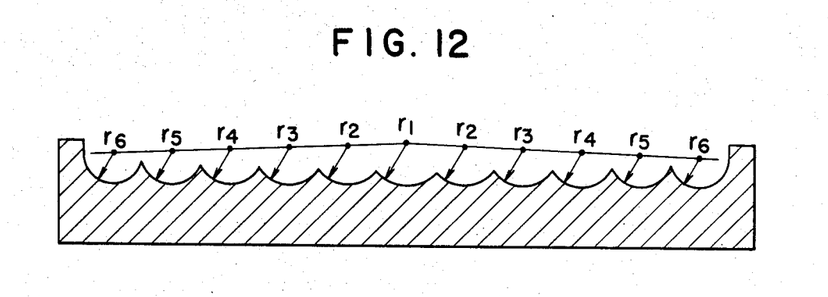
FIG. 12 is a sectional view of a mold for molding the lenticular lens as shown in FIG. 11.

In order to fabricate the lenticular lens as shown in FIG. 11, a mold as shown in FIG. 12 may be used which has a cavity corresponding to the lenticular lens as shown in FIG. 11.

The radii of curvature of the cavities each forming a lenticular convex lens element 2 must be determined depending upon the bending of a molding roll or the flow of a plastic when a flat press mold is used. In addition, the radii of curvature must be determined depending upon the variation in thickness of the blank of the lenticular lens 1.

For instance, when a blank sheet of a lenticular lens is formed with a flat press mold, the thickness of the lenticular convex lens at the edge or periphery of the formed lenticular lens is thinner than the thickness of the lenticular convex lens at the center of the lenticular lens by about 5%. In the case of a press roll, the thickness of the lenticular convex lens at the edge is thinner than the thickness of the lenticular convex lens at the center by about 10%. It follows therefore that the radius of curvature of the lenticular convex lens at the edge or periphery must be decreased by 5% or 10% depending upon the variation in thickness of the blank of the lenticular lens.

In the case of a press roll, the thickness of a lenticular lens obtained varies along a curved line toward its periphery in a strict sense. In the case of a conventional blank of a lenticular lens, the variation in thickness is little. That is, it can be understood that the thickness varies almost linearly. Therefore, the mold to be used is so designed that the radii of curvature of cavities are linearly gradually decreased.

When the lenticular lens in accordance with the present invention is colored in such a way that the lenticular lens remains optically transparent, the reflectivity of the region which is not formed with the masking stripes is decreased. Accordingly, the contrast of the projected image can be further improved. The lenticular lens may be colored by the coating or direct or transfer printing process or by bonding a colored sheet to the lenticular lens, but it is to be understood that a suitable pigment or the like is mixed into a material of a lenticular lens blank. Alternatively, light diffusing materials such as silica or glass powder, which are added in order to enhance the diffusion of the emerging light rays, may be previously colored. However it should be noted that if the light diffusion material is uniformly distributed in the lenticular lens, the contrast of the projected image is somewhat degrated. Therefore, it is preferable that the light diffusion material is rather concentrated adjacent to the surface of the lenticular lens from which light rays emerge. In addition, the light merging surface may be treated by the sand blasting process so that the contrast of the projected image may be improved.

In order to fabricate the lenticular lenses in accordance with the present invention, any materials which are transparent and which have excellent desired optical properties may be used. From a fabrication standpoint, it is preferable to use transparent synthetic resin sheets or the like which can be easily molded. The sheet or the like may have a single layer or may be a laminated sheet. For instance, transparent plastics are acrylic plastics such as polymethacrylic methyl, polyvinyl chloride, polycarbonate, polystyrene, cellulose plastics and the like.

Corrugated lenticular convex lens elements can be molded simultaneously with or after a lenticular lens blank is formed, but from a fabrication standpoint it is preferable that corrugated lenticular convex lens elements are molded immediately after a lenticular lens blank is formed by the extrusion or calender process. In the case of the roll forming, a roll is used which is made of a metal, a plastic, a rubber, a wood or a composite material and which has a cavity produced by the machining, electrolytic, electric discharge, laser, etching or electric casting process. In order to produce the channel-like grooves at the top surfaces of the corrugated projections or ridges 3 or 12, a molding roll which is prepared in a manner substantially similar to that described above may be used.

The molding rolls which are fabricated in the manner described above are so disposed with respect to each other that the corrugated projections or ridges, that is, the raised non-transmittance regions may be formed. Thereafter, a lenticular lens blank is made to pass between them while the blank or/and the rolls are heated, whereby a lenticular lens in accordance with the present invention can be fabricated.

As described above, the masking stripes consisting of a light absorbing compound can be formed over the top and side portions of the corrugated projections or ridges of the lenticular lens. When a light absorbing compound is selected, the properties of an optically transparent lenticular lens blank must be taken into consideration. For instance, a light absorbing compound may be prepared by mixing into an ink or paint having a suitable vehicle a suitable delustering agent such as a black or gray pigment. The black or gray pigment is, for example, silica, calcium carbonate or the like. In order to apply such light absorbing compound over the tops of the corrugated projections or ridges and their side surfaces or in order to fill a light absorbing compound into the channel-like grooves formed in the tops of the corrugated projections or ridges, the roll coating process, photogravure process, offset printing process, gravure offset printing process, typographic printing process, silk screen printing process, transfer printing process, fiber implanting process or the like may be used. In order to fill a light absorbing compound in the channel-like grooves 21 formed in the tops of the corrugated projections or ridges in a satisfactory manner as shown in FIG. 3, it is preferable that the depth of the groove is smaller than the height of the projections or ridges. More preferably the depth of the groove is 5 to 20% of the height of the projections or ridges.

When the fiber implanting process is used to form the masking stripes, a higher degree of delustering can be obtained. In addition, as compared with other processes, relatively extremely bright scenes can be suppressed when the viewing angle is changed. As a result, the contrast of the projected image can be much improved.

The fiber implanting process is such that an adhesive is first applied to the tops of the projections or ridges and then fibrous materials are implanted by blowing them.

Figure 13:
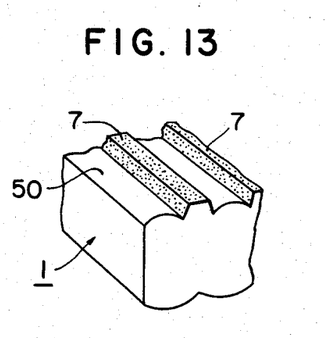
FIG. 13 is a perspective view of a lenticular lens in which corrugated lenticular convex lens elements are formed over the surface observed by viewers.
Figure 14:
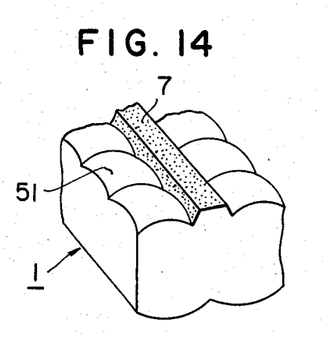
FIG. 14 is a perspective view of a lenticular lens in which dome shaped lenticular convex lens elements are formed over the observed surface thereof.

In the above embodiments, the bottoms of the grooves between the parallel projections or ridges 3 or 12, that is, the surfaces opposite to the lenticular convex lens elements are flat as shown in FIGS. 1, 2 and 3, but it is to be understood that they may be in the form of an elongated convex lens element 50 as shown in FIG. 13 or each bottom may consist of a plurality of dome-shaped or partially spherical lens elements 51 as shown in FIG. 14.

What is claimed is:

1. A rear projection screen of the type comprising a circular Fresnel lens consisting of a plurality of concentrically circular lens elements and a lenticular lens means having a plurality of corrugated parallel convex lens elements formed over one surface thereof, the other surface of said lenticular lens means being formed with a plurality of parallel projections or protrusions extended in the longitudinal direction of said lenticular lens elements, masking stripes being formed over said parallel projections or protrusions, the improvement wherein the side surfaces of each of said parallel projections or protrusions are so cut that they will not intercept the light rays emerging from said corrugated parallel convex lens elements of said lenticular lens means.

2. A rear projection screen as set forth in claim 1, wherein each of said side surface of each of said parallel projections or ridges is inclined at an angle with respect to a reference surface which is the bottom of a groove or valley between the adjacent parallel projections or protrusions, and said angle is greater than a maximum or greatest angle between said reference surface and a light ray emerging therefrom.

3. A rear projection screen as set forth in claim 2, wherein each of said masking stripes is formed not only over the top of each projection or protrusion but also the inclined side surfaces thereof.

4. A rear projection screen as set forth in claim 1, wherein each of said parallel projections or protrusions has a substantially semicircular cross sectional configuration, and the masking stripe is formed over the whole surface of each of said parallel projections or protrusions.

5. A rear projection screen as set forth in claim 1, wherein the center line of each of the masking stripes is deviated by a distance d given by the following relationship from the boundary between the adjacent corrugated parallel convex lens elements toward the center line of said lenticular lens means $$dt = t \times \tan \sin^{-1} \frac{\sin \tan^{-1}(R/F)}{n}$$

where
d = the deviation as defined above,
t = the thickness of said lenticular lens means,
R = the distance between the center line of said lenticular lens means and a point at which is incident a light ray emitted from a projector means,
F = the focal length of said Fresnel lens in the image space, and
n = the index of refraction of said lenticular lens means.

6. A rear projection screen as set forth in claim 1, wherein said corrugated parallel convex lens elements of said lenticular lens means have different radii of curvature in such a way that the more each of said corrugated parallel convex lens elements is spaced apart from the center line of said lenticular lens means, the lesser the radius of curvature thereof becomes.

7. A rear projection screen as set forth in claim 2, wherein the bottom surface of each groove or valley between the adjacent parallel projections or protrusions is in the form of a convex lens element.

8. A rear projection or translucent screen as set forth in claim 4, wherein the bottom surface of each groove or valley between the adjacent parallel projections or protrusions is in the form of a convex lens element.

9. A rear projection screen as set forth in claim 2, wherein the bottom surface of each groove or valley between the adjacent parallel projections or protrusions is in the form of a plurality of interconnected dome-shaped or partially spherical convex lens elements.

10. A rear projection screen as set forth in claim 4, wherein the bottom surface of each groove or valley between the adjacent parallel projections or protrusions is in the form of a plurality of interconnected dome-shaped or partially spherical convex lens elements.

* * * * *